(12) United States Patent
Bonko

(10) Patent No.: US 6,209,602 B1
(45) Date of Patent: Apr. 3, 2001

(54) INDUSTRIAL SERVICE AGRICULTURAL TIRE

(75) Inventor: Mark Leonard Bonko, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/242,142

(22) PCT Filed: Aug. 29, 1999

(86) PCT No.: PCT/US96/13785

§ 371 Date: Feb. 3, 1999

§ 102(e) Date: Feb. 3, 1999

(87) PCT Pub. No.: WO98/08697

PCT Pub. Date: Mar. 5, 1998

(51) Int. Cl.$^7$ .......................... B60C 11/11; B60C 101/00; B60C 107/02; B60C 121/00

(52) U.S. Cl. .................. 152/209.12; 152/209.26

(58) Field of Search ........................... 152/209.1, 209.12, 152/209.8, 902, 209.26, 209.28

(56) References Cited

U.S. PATENT DOCUMENTS

| D. 155,065 | 9/1949 | Bete . |
| D. 255,674 | 7/1980 | Menin ................................. D12/147 |
| D. 256,008 | 7/1980 | Menin ................................. D12/147 |

(List continued on next page.)

FOREIGN PATENT DOCUMENTS

| 27 51 295 A1 | 5/1978 | (DE) . |
| 89 07 334 U | 8/1989 | (DE) . |
| 0 089 320 A2 | 9/1983 | (EP) . |
| 2157211 * | 5/1973 | (FR) ................................. 152/209.12 |
| 15911139 * | 6/1981 | (GB) ................................ 152/209.12 |
| 57-167802 | 12/1982 | (JP) . |

OTHER PUBLICATIONS

Patent Abstracts of Japan, vol. 7, No. 9, Jan. 14, 1983.

*Primary Examiner*—Steven D. Maki
(74) *Attorney, Agent, or Firm*—David L King

(57) ABSTRACT

A pneumatic agricultural tire 20,200 for an industrial type tractor or like vehicle has a plurality of central lugs 50 and a plurality of shoulder lugs 40. The plurality of central lugs 50 are arranged in a circumferentially continuous row 60 and extend across the equatorial plane (EP). Each central lug 50 is similar in shape and orientation relative to each circumferentially adjacent central lug 50. Each central lug 50 has a leading end 51 and a trailing end 53. The leading ends 51 of each lug 50 is located on an opposite of the equatorial plane relative to the trailing end 53 of the same central lug 50. The plurality of shoulder lugs 40 are divided into first and second rows 44,46 and project radially outwardly from the inner tread 34 and extend from the lateral tread edges 33A,33B toward the equatorial plane of the tire 20,200. The shoulder lugs 40 have an axially inner end 41 being axially spaced from a leading end 51 and a trailing end 53 of the axially adjacent central lugs 53. The shoulder lugs 40 are similar in shape and have an overall lug length $L_L$ of greater than 30% of the tread width. The space between the axially inner end 41 of the shoulder lugs 40 and the ends 51,53 of the central lugs 50 create two distinct circumferentially continuous channels 70 within the tread 32. The invention has a tire 20 having a directional tread 32 and a tire 200 having a nondirectional tread 32.

12 Claims, 9 Drawing Sheets

U.S. PATENT DOCUMENTS

| | | | | |
|---|---|---|---|---|
| D. 295,399 | * | 4/1988 | Nishio et al. | D12/147 |
| D. 303,365 | | 9/1989 | Bonko | D12/151 |
| D. 303,366 | | 9/1989 | Bonko | D12/151 |
| D. 303,367 | | 9/1989 | Bonko et al. | D12/151 |
| D. 303,779 | | 10/1989 | Bonko | D12/151 |
| D. 304,320 | | 10/1989 | Bonko | D12/151 |
| D. 309,125 | | 7/1990 | Bonko et al. | D12/151 |
| D. 333,453 | | 2/1993 | Cook et al. | D12/147 |
| D. 336,269 | | 6/1993 | Hinrichsen et al. | D12/147 |
| D. 363,907 | | 11/1995 | Bonko | D12/151 |
| 4,446,902 | * | 5/1984 | Mades et al. | 152/209.12 |
| 4,649,976 | | 3/1987 | Cherveny et al. | 152/209 R |
| 4,982,773 | | 1/1991 | Bonko | 152/209 B |
| 4,982,775 | | 1/1991 | Matsumoto | 152/209 B |
| 5,318,085 | * | 6/1994 | Vekselman | 152/902 |
| 5,411,067 | * | 5/1995 | Beeghly et al. | 152/209.12 |
| 5,421,388 | * | 6/1995 | Bonko et al. | 152/209.12 |
| 5,464,050 | * | 11/1995 | Bonko | 152/209.12 |
| 5,658,404 | * | 8/1997 | Brown et al. | 152/209.26 |
| 5,901,765 | * | 5/1999 | Bonko | 152/209.12 |
| 6,062,282 | * | 5/2000 | Bonko | 152/209.12 |

* cited by examiner

INDUSTRIAL SERVICE AGRICULTURAL TIRE

TECHNICAL FIELD

This invention relates to a pneumatic agricultural tire for an industrial type tractor or like vehicle.

BACKGROUND ART

Farm tire designs for industrial service are classified as R4 service. Overall R4 service is quite severe and typically involves high loads at a large degree of roading. The vehicles to which the tires are mounted typically are exposed to large amounts of debris, hard packed soil conditions and high load service conditions.

Often times the vehicle has a back hoe bucket or a front skid loader attached to the vehicle. The tires must traverse gravel and broken concrete and hard packed dirt normally. Occasionally the work site can get rain soaked requiring good traction in wet soil conditions.

These tires are generally relatively small and typically have a nominal rim diameter of 28" (71 cm) or less. They generally have a nonskid depth at the centerline of the tire at approximately 1" (2.54 cm). A typical tire may be a 19.5LR24 tire. This tire when produced in a radial construction will have a carcass with 3 to 4 plies of synthetic cord reinforcement. The cords generally are nylon or polyester. The carcass will further include four belts of high flex polyester, nylon or aramid. Historically, these tires have been all fabric reinforced in order to provide better ride and handling.

The most relevant prior art is Japanese Publication No. 57167802, the tire of this invention travels well on both good and soft roads. Its tread pattern consists of three regions with almost the same width. At the two side regions, lugs are arranged alternately on the tire circumference to form arrowhead pattern. They are at an acute angle to the tire equator. At the central region, independent long blocks are laid across the tire equator. Each block is placed on a line extended from the longitudinal centerline of one lug located on one of the side regions. The adjacent blocks face each other and overlap for a certain range but separated by a groove along the equator.

Another prior art document, U.S. Pat. No. 4,659,976, discloses a tire for use on a military vehicle, the tire has traction elements separated by straight grooves.

Yet another prior art, (German Patent No. DE 27 51 295 A1), discloses a farm tire having elongated lugs 6 spaced from the center of the tread and in at least one embodiment, the lugs 6 are separated by square blocks 9.

There has been a continual tradeoff in attempting to increase the aggressive offroad and tractor performance of these tires while maintaining the treadwear durability and ride requirements. The invention disclosed in this patent application teaches a novel tread that is both comfortable riding, long wearing while also achieving superior offroad traction.

DISCLOSURE OF THE INVENTION

SUMMARY

A pneumatic agricultural tire 20 for an industrial type tractor of like vehicle having a maximum section width (W), an axis of rotation, an equatorial plane (EP), centered between the maximum section width and being perpendicular to the axis, a casing having a belt reinforcement structure 26 and a carcass 21 reinforced with rubber coated cords, a rubber tread 32 disposed radially outward of the carcass 21 and belt 26, the tread 32 being divided on each side of the equatorial plane into a first and second tread half, the tread has a pair of lateral edges 33A,33B, the distance between the lateral edges defines the tread width. The tread 32 has an inner tread 34 and a plurality of tread lugs 40,50 projecting radially from the inner tread 34.

The tread 32 has a plurality of central lugs. 50 and a plurality of shoulder lugs 40. The plurality of central lugs 50 are arranged in a circumferentially continuous row 60 and extend across the equatorial plane (EP). Each central lug 50 preferably is similar in shape and in orientation relative to each circumferentially adjacent central lug 50. Each central lug 50 has a leading end 51 and a trailing end 53. The leading end 51 of each central lug 50 is located on an opposite side of the equatorial plane relative to the trailing end 53 of the same central lug 50.

The plurality of shoulder lugs 40 are divided into first and second rows. One row 44,46 extends from each of the lateral edges 33A,33B towards the equatorial plane of the tire 20. The shoulder lugs 40 have an axially inner end 41 axially spaced from a leading end 51 and a trailing end 53 of the axially adjacent central lugs 50. Preferably, the shoulder lugs 40 extending from each lateral edge 33A,33B are similar in shape and have an overall lug length of 40% of the tread width. Each shoulder lug 40 is located within one tread half 32A or 32B.

The shoulder lugs 40 and central lugs 50 are axially spaced at the outer surface 58 of the lug 40,50 such that the axially inner ends 41 of the first and second rows 44,46 of shoulder the lugs 40 are axially aligned within each respective row 44,46 and the leading ends 51 and trailing ends 53 of the central lugs 50 are respectively axially aligned. A plane $P_1$ tangent to the axially inner ends 41 of the first row 44 of shoulder lugs 40 is spaced an axial distance $d_1$ from a plane $C_T$ tangent to the trailing ends 53 of the central lugs 50. A plane $P_2$ tangent to the axially aligned inner ends 41 of the second row 46 of shoulder lugs 40 is spaced a distance $d_2$ from a plane $C_L$, the plane $C_L$ being tangent to the leading ends of the central lugs. The distances $d_1$ and $d_2$ form two circumferentialy continuous straight channels around the periphery of the tread. In the preferred embodiment the distances $d_1$ and $d_2$ are equal and are about 5% of the tread width. The plane $C_T$ and $C_L$ are each located an axial distance of at least 5% of the tread width or more from the equatorial plane. Preferably the plane $C_T$ and $C_L$ are equally spaced from the equatorial plane a distance greater than 10%.

In one embodiment the shoulder lugs 40 of the first and second rows 44,46 are oppositely oriented and similarly inclined relative to the shoulder lugs 40 of the opposite row 44,46. In this case, the tire tread 32 is a nondirectional tread having equal traction in both the forward and reverse direction.

In a second embodiment the shoulder lugs of the first and second rows are oppositely oriented and oppositely inclined relative to the shoulder lugs of the opposite row. In this case, the tire tread is directional and has a superior tractive capability in the forward direction when the tire is mounted such that the leading ends contact the ground first as the tire rolls. The tire in either case has a very open tread pattern for its application and when the tire is normally inflated and loaded the tread has a net-to-gross ratio of less than 35% preferably about 30%.

These tires typically have nominal rim diameter of 28" (71 cm) or less and a tread lug height that is measured from the inner tread to the radially outer surface of the lug at the equatorial plane the lug height being an industrially standard R-4 lug height.

Each shoulder lug and central lug has a surface area centroid M. The centroid M of the first row shoulder lug, a central lug and a second row shoulder lug lie on a substantially straight line $S_L$. $S_L$ is inclined in a range of 35° to 45° relative to an axial plane. In the nondirectional tire the shoulder lugs of the first and second row and the central lugs each have lug center lines intersecting the centroid M of the respective lugs. The lug centerlines are substantially aligned with the line $S_L$. In the nondirectional tire each shoulder lug and central lug has a centroid M, the centroid of the first or second shoulder lug and a central lug lie in a substantially straight line $S_{L2}$, $S_{L2}$ being inclined in the range of 35° to 45° relative to an axial plane. Each shoulder lug and central lug have a center line intersecting the centroids M of the respective lugs. The lug centerlines of the first shoulder lug and the central lug are substantially aligned with the line $AL_2$. The shoulder lug center line of the second row lug is similarly but oppositely inclined relative to the line $SL_2$.

Definitions

"Aspect Ratio" means the ratio of its section height to its section width. "Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers, the bead or beads under the tread being encapsulated in tread rubber can be with or without other cord reinforced fabric elements.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Lading" refers to a portion or part of the tread that contacts the ground first, with respect to a series of such parts or portions, during rotation of the tire in the direction of travel.

"Net-to-gross Ratio" means the ratio of the surface are of the normally loaded and normally inflated tire tread rubber that makes contact with a hard flat surface, divided by the total area of the tread, including noncontacting portions such as grooves as measured around the entire circumference of the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with respect to a series of such parts or portions during rotation of the tire in the direction of travel.

"Tread Arc Width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit Tread Pressure" means the radial load borne per unit area (square centimeter or square inch) of the tread surface when that area is in the footprint of the normally inflated and normally loaded tire.

BRIEF DESCRIPTION OF DRAWINGS

The following is a brief description of the drawings in which like parts bear like reference numerals and in which.

DETAILED DESCRIPTION OF THE INVENTION

Figure 4:
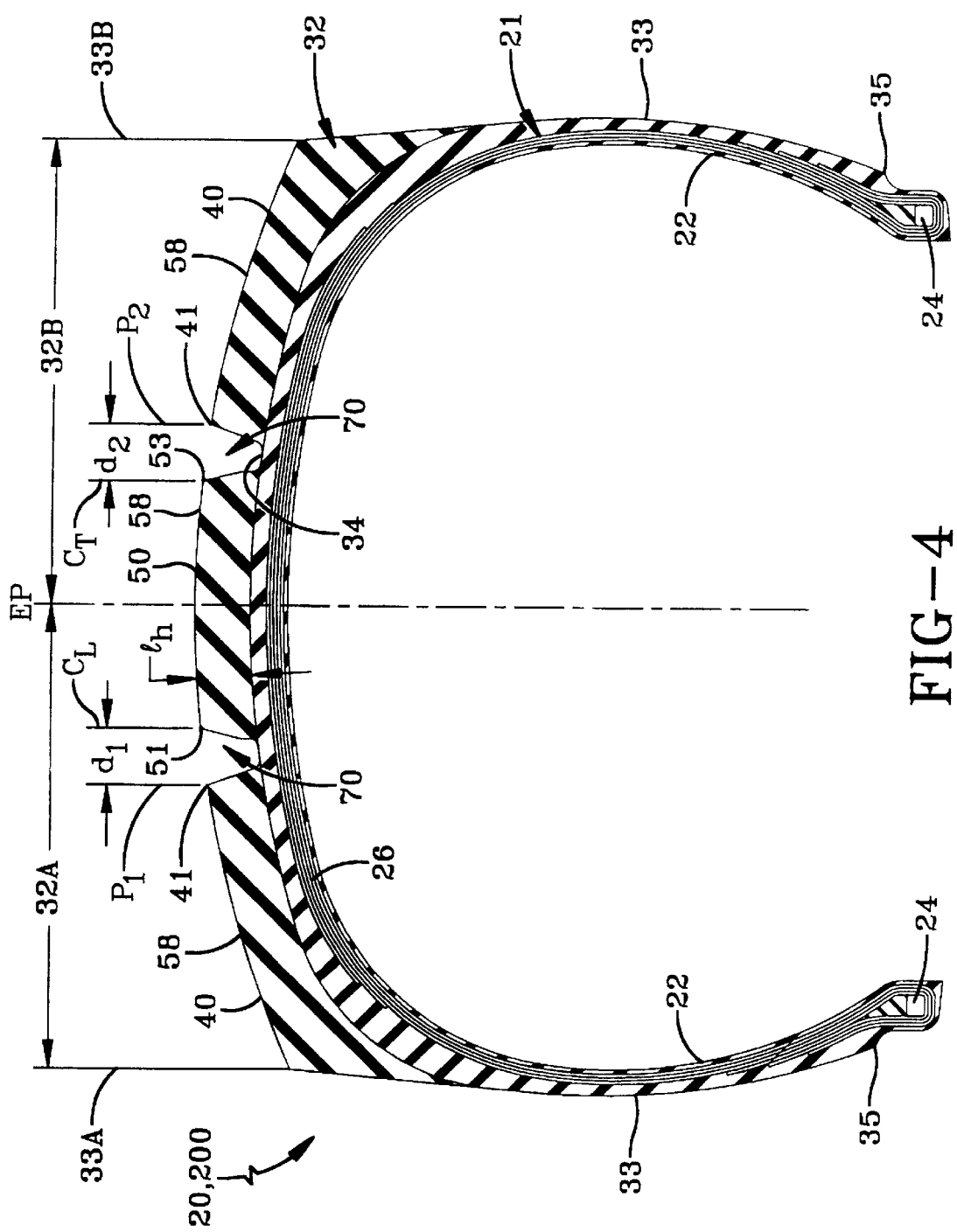
FIG. 4 is a cross-sectional view of the tire taken along lines 4—4 of FIG. 2.

Now referring to FIG. 4 a tire is shown in cross-sectional view generally as reference numeral 20. The tire has a carcass 21 having one or more carcass plies 22 extending circumferentially about the axis rotation of the tire. As illustrated the tire preferably has 3 to 4 cord reinforced plies having synthetic nylon or polyester cords. The carcass plies are anchored around a pair of substantially inextensible annular beads 24. A belt reinforcing member 26 has one or more belt plies disposed radially outward from the carcass plies. Preferably four belts are employed. The belts being of a polyester, nylon or aramid cord reinforcement alternatively the cords can be of an ultra high tensile monofilament steel cord reinforcement. These belt plies provide reinforcement for the crown region of the tire 20. A circumferentially extending tread 32 is located radially outwardly of the belt reinforcing structure 26.

A sidewall portion 33 extends radially inwardly from each axial or lateral tread edge 33A,33B of the tread to an annular bead portion 35 having the beads 24 located therein. Carcass plies 22 preferably have the cords oriented radially. The number of plies depends on the load carrying requirements of the tire. This tire carcass and belt structure as shown in FIG. 4 is equally applicable for use in both embodiments of the present invention. FIGS. 1–5 illustrate a directional tread made in accordance to the present invention, whereas FIGS. 6–9 illustrate a tread pattern made in a nondirectional fashion.

Figure 1:
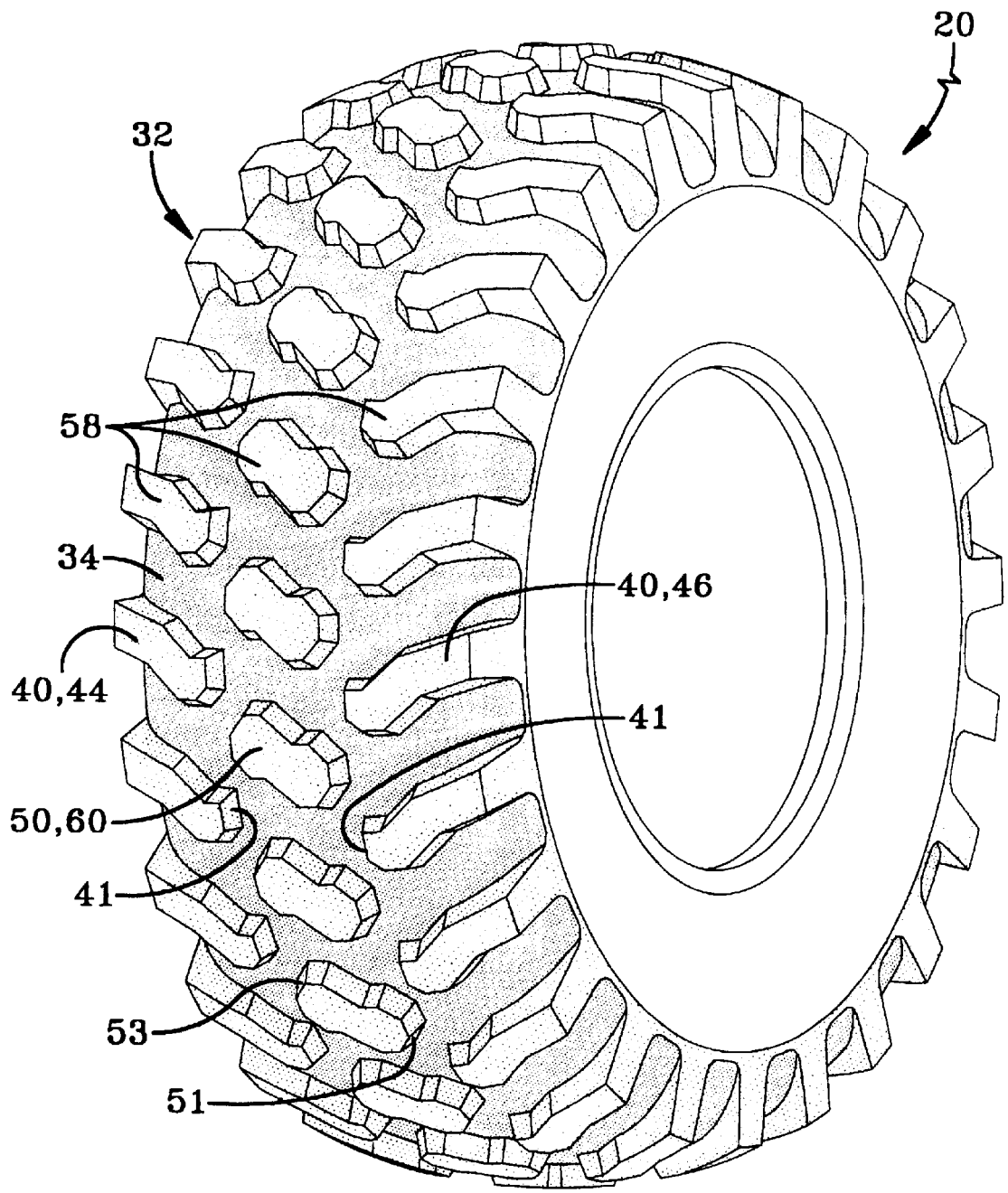
FIG. 1 is a perspective view of a first embodiment tire according to the invention.
Figure 2:
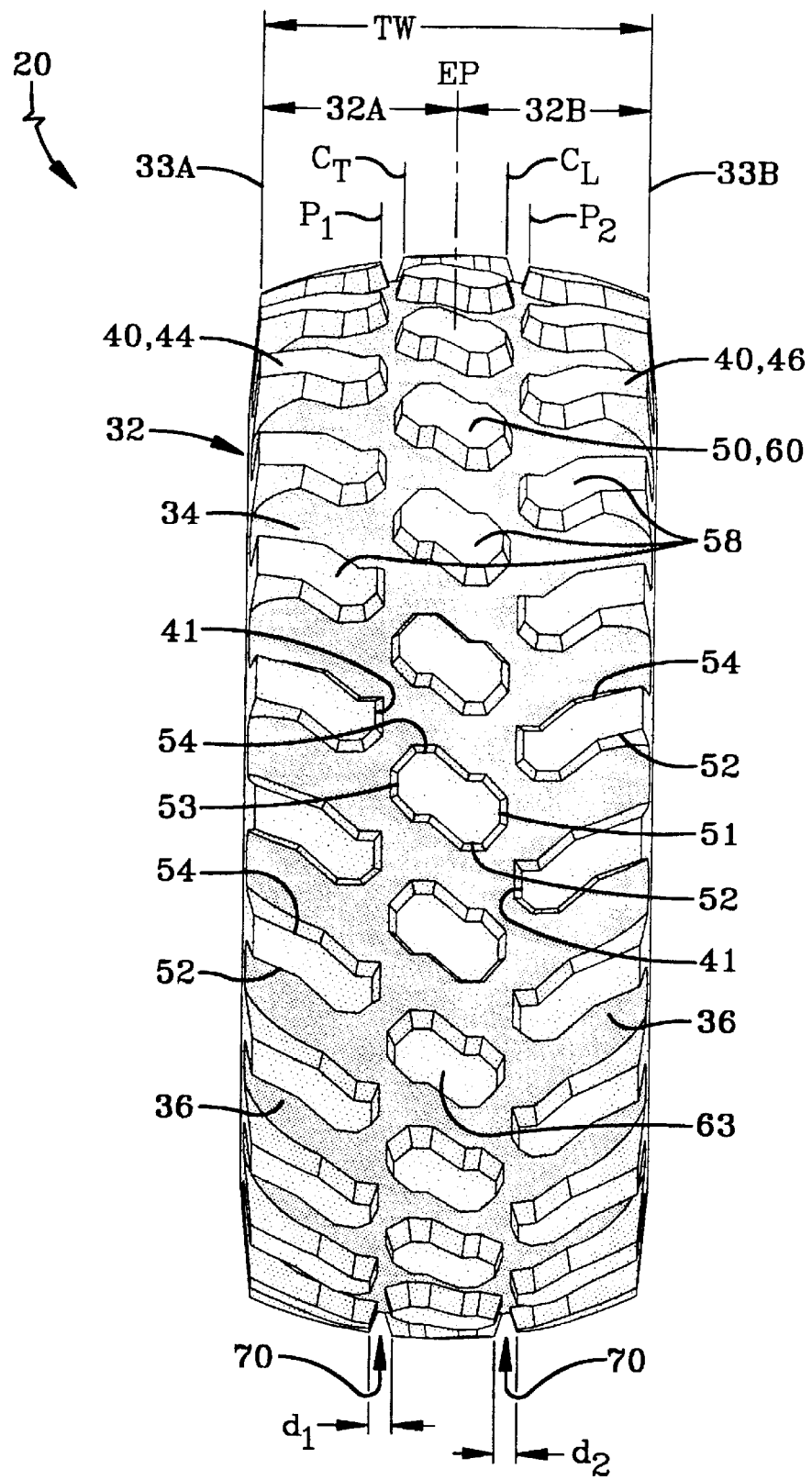
FIG. 2 is a plan view of the tire of FIG. 1.
Figure 3:
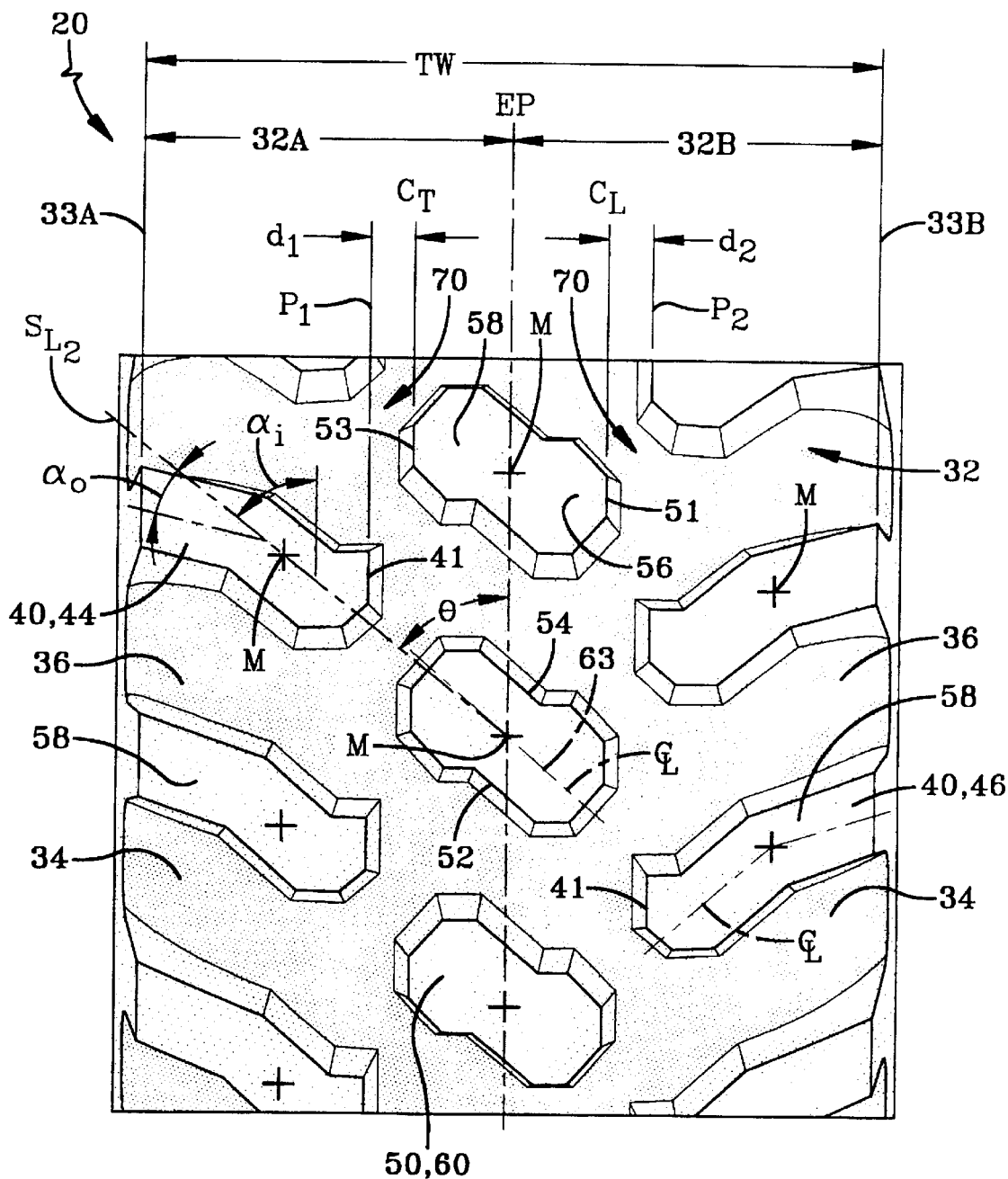
FIG. 3 is an enlarged fragmentary view of a portion of the tread of the tire taken from FIG. 2.

Now referring to FIGS. 1–5, a tire 20 according to the present invention, is illustrated. The tire 20 according to the present invention as a unique directional tread 32. The tread 32 has a first tread edge 33A and a second tread edge 33B. Disposed between the tread edges 33A and 33B is an inner tread 34 and a plurality of central lugs 50 extending radially outwardly from the inner tread 34. As illustrated in FIG. 2 each central lug 50 has a radially outer surface 58, a leading first edge 52, a trailing second edge 54, and a center line between the first and second edges. Each central lug 50 extends generally circumferential from a leading end 51 to a trailing end 53.

The average distance along the center line 63 between the leading and trailing ends 51,53 defines the total lug length $L_1$ of the central lug. The length $L_1$ is at least 10% of the tread width, preferably about 30%.

The distance extending substantially perpendicularly between the first and second edges 52,54 of the central lug 50 define the lug width (lw). The radial distance extending between the inner tread 34 and the tread edges 52,54 of the lug defines the radial lug height ($l_h$). At the equatorial plane of the tire 20 the lug height preferably is an R-4 type lug height as specified by the Tire & Rim Industry standard for industrial service applications.

The central lugs 50 are arranged in a circumferentially repeating row 60 of lugs 50, each lug 50 extends crossing the equatorial plane (EP). The circumferentially adjacent central lugs 50 are similarly oriented. Each lug 50 preferably lies equally within each of the respective tread halves 32A or 32B. The leading ends 51 as shown lie entirely within tread half 32A while the trailing ends 53 lie entirely the tread half 32B. These central lugs 50 have an enlarged lug head 55 at both the trailing and leading ends 51,53 of the lug 50. The width of the lugs 50 is enlarged relative to the shoulder lugs 40. This enlarged lug 50 is extremely durable and provides excellent traction and ride performance.

Figure 5:
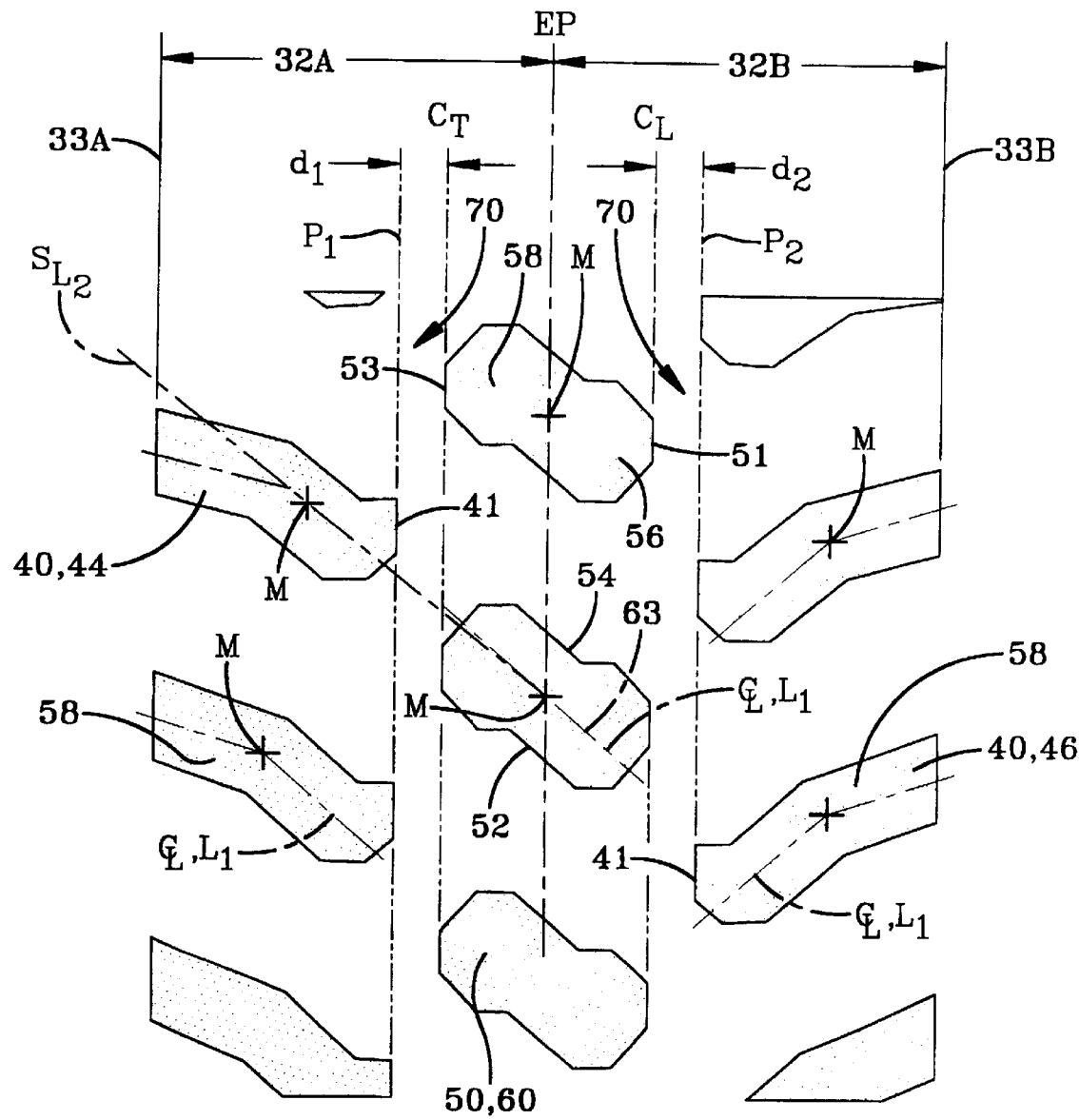
FIG. 5 is a plan view of a portion of the contact patch of the first embodiment tire according to the present invention.
Figure 6:
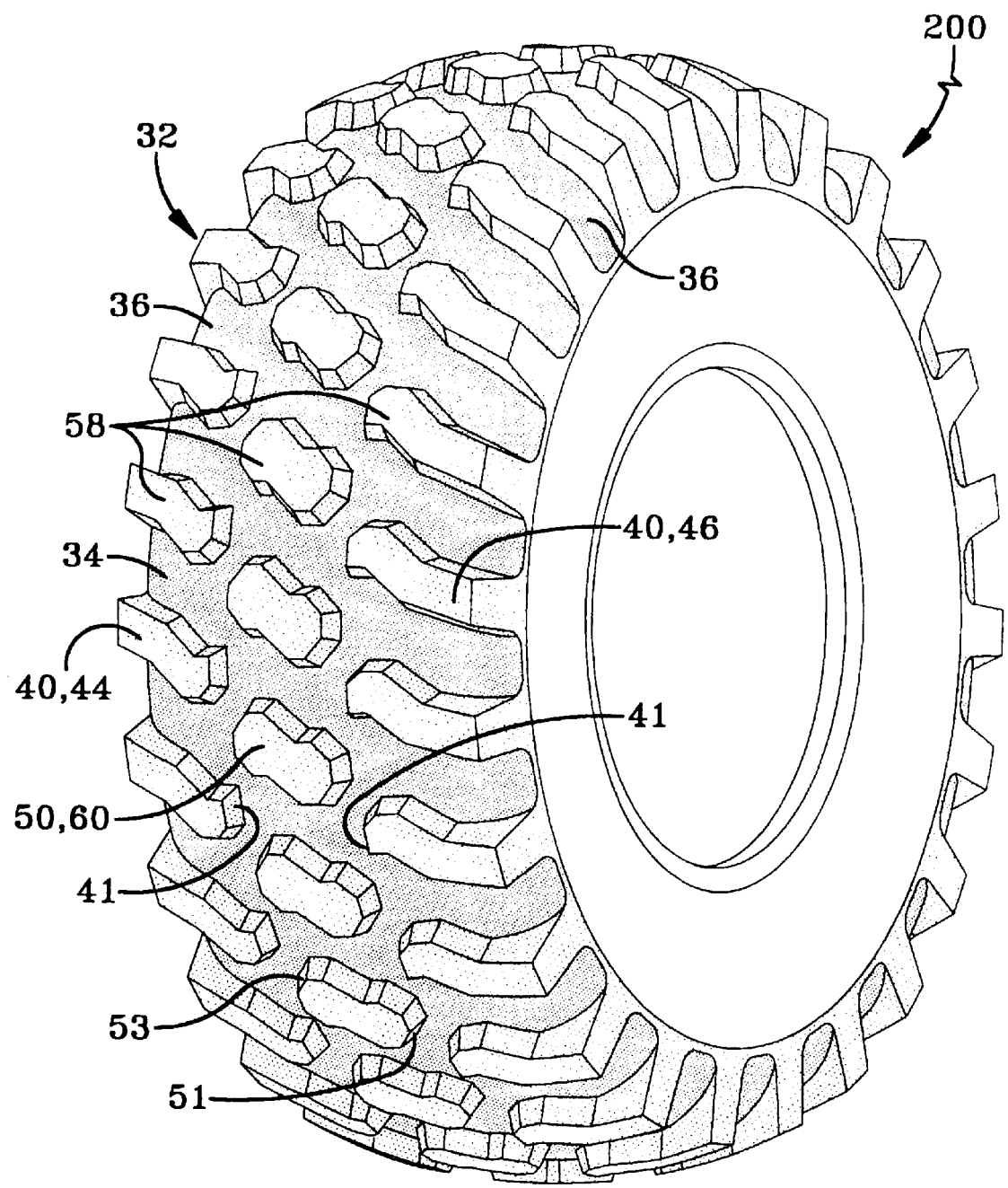
FIG. 6 is a perspective view of a second embodiment tire according to the invention.
Figure 7:
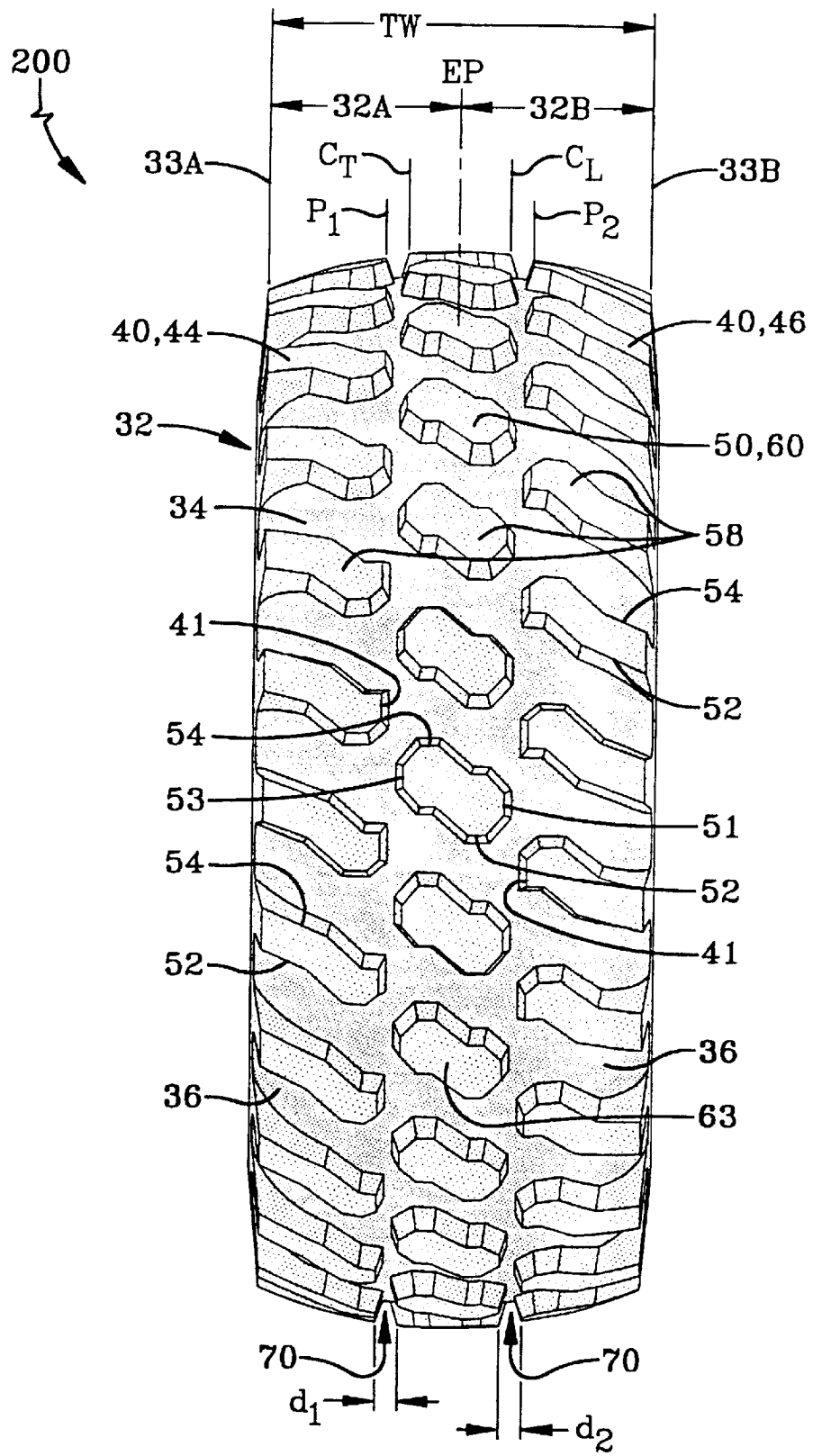
FIG. 7 is a plan view of the tire of FIG. 6.
Figure 8:
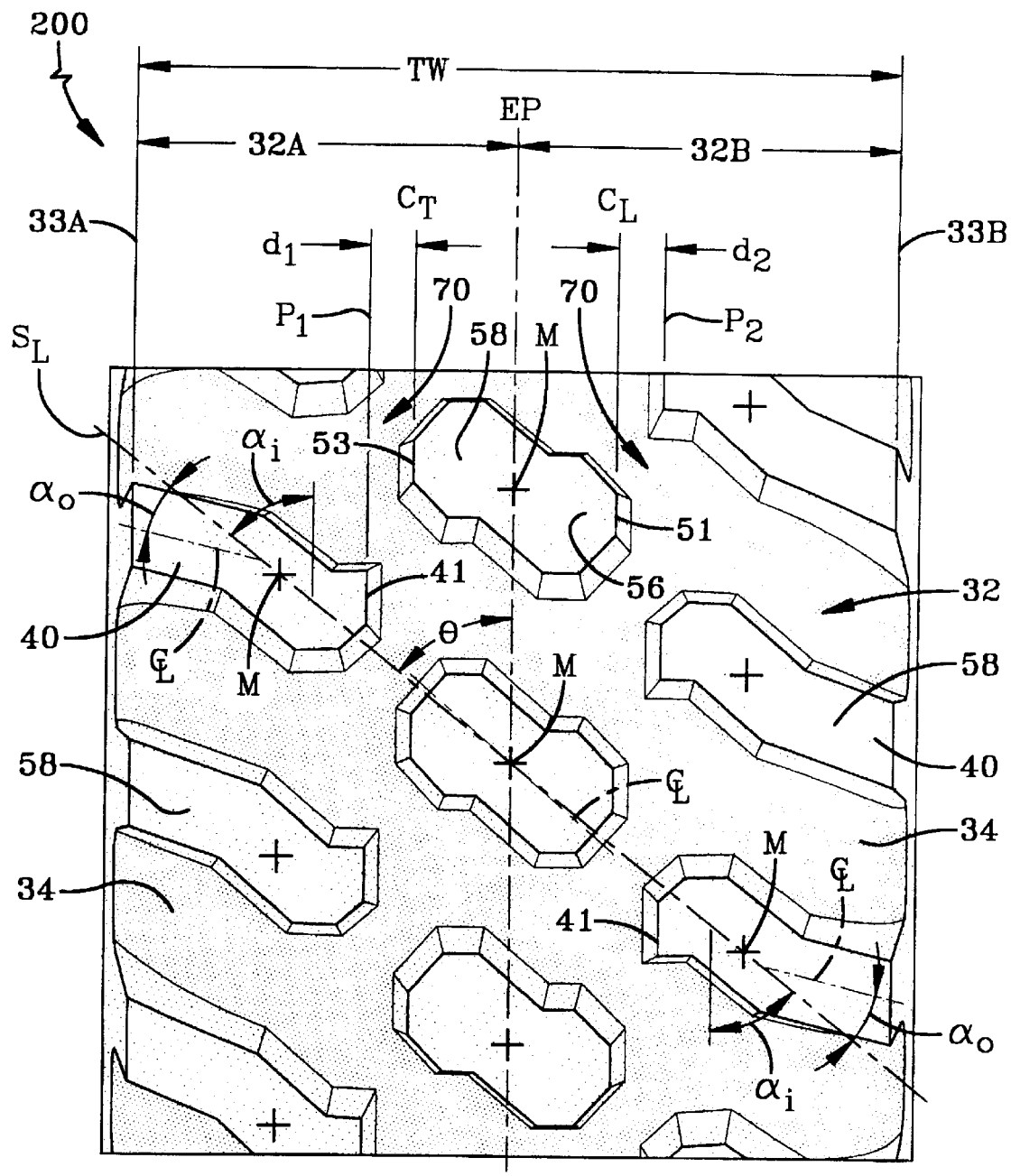
FIG. 8 is an enlarged fragmentary view of a portion of the tread of the tire taken from FIG. 7.

The ride performance and traction capabilities is further enhanced by the employment of a plurality of shoulder lugs 40 which extend from each respective tread edge 33A or 33B and lie entirely within one tread half 32A or 32B. The shoulder lugs 40 have a total lug length $L_1$ equal to or greater than the total lug length $L_1$ of the central lug 50. As shown, the shoulder lugs have a lug length $L_1$ of about 35%. The shoulder lugs are divided into two rows: a first row 44 and a second row 46. The first row 44 of shoulder lugs 40 has an axially inner end 41 that is located circumferentially between the trailing end 53 of circumferentially adjacent central lugs 50. The second row 46 of shoulder lugs 40 extend from the tread edge 33B and have a length substantially equal to the length of the first row of shoulder lugs. The second row 46 of shoulder lugs 40 have an axially inner end 41 that is circumferentially located between the leading ends 51 of circumferentially adjacent central lugs 50. As shown in FIG. 5, both the first row 44 and second row 46 of shoulder lugs 40 have preferably a compound inclination. The axially inner inclination $\alpha_i$ being about 45° relative to the equatorial plane of the axially outer inclination $\alpha_o$ is about 60° relative to the equatorial plane. As further shown in FIG. 5, the central lug 50 has a middle portion which has a center line 63 intersecting the leading and trailing ends 51, 53 lying between edges 52,54. The centerline 63 is oriented at an angle θ of less than 50° preferably less than 45° relative to the equatorial plane.

As shown in FIG. 5, the net-to-gross ratio of the tread is less than 35%. The space between the lugs creates large soil discharge channels 36. These channels create a very open tread pattern. The openness of the tread pattern further enhances the self-cleaning properties of the tread 32 keeping it from packing with mud.

It is understood that one can vary the overall shape of the lugs 40,50 and can modify the general orientation or appearance of the lugs without departing from the spirit of the claimed invention which is directed to the novel tread patterns disclosed herein.

With further reference to FIG. 5, the first row 44 and second row 46 of shoulder lugs 40 and the central lugs 50 are axially spaced at the outer surface 58 of the lugs 40,50 such that the axially inner ends 41 of the first and second rows 44,46 of shoulder lugs 40 are axially aligned within each respective row 44,46. The leading ends 51 and the trailing ends 53 of the central lugs 50 are also respectively axially aligned. A plane $P_1$ is tangent to the inner ends 41 of the first row 44 of shoulder lugs 40 and is spaced an axially distance $d_1$ from a plane $C_T$ tangent to the trailing ends 53 of the central lugs 50. A plane $P_2$ tangent to the axially inner ends 41 of the second row 46 of the shoulder rows 40 is spaced a distance $d_2$ from a plane $C_L$. The plane $C_L$ is tangent to the leading ends 51 of the central lugs 50. The distance $d_1$ and $d_2$ form two circumferentially continuous straight channels 70 around the periphery of the tread 32. The agricultural tire preferably has the distances $d_1$ and $d_2$ being equal and the planes $C_T$ and $C_L$ each located an axial distance of 5% of the tread width or more from the equatorial plane (EP) as illustrated. Preferably the plane $C_T$ and $C_L$ are equally spaced from the equatorial plane (EP) a distance of at least 10% of the tread width.

The tire 20 as shown in FIGS. 1–5 has a directional tread 32 with as the first and second rows 44,46 of shoulder lugs 40 oppositely oriented and oppositely inclined relative to the shoulder lugs 40 of the opposite row.

With reference to FIGS. 6–9 a tread 32 of the second embodiment tire 200 is shown having a nondirectional tread pattern. For simplicity purpose the same reference numerals are used, the only difference lies in the treads 32, the tread 32 of tire 200 having the first row 44 of shoulder lugs 40 oppositely oriented but similarly inclined relative to the shoulder lugs 40 of the opposite row 46 as can be seen from the perspective view of FIG. 6 and the plan view of FIG. 7, the lugs 40 and 50 extend in a substantially linear fashion across the tread 32. In both tires 20,200 of the first and second embodiments when the tire is normally loaded and inflated, the tread 32 exhibits a net-to-gross ratio of less than 35% preferably about 30%. Both tires 20,200 exhibit a nominal rim diameter of 28" (71 cm) or less and a tread lug height ($l_h$) that is measured from the inner tread 34 to the radially outer surface 58 of the lugs 50 at the equatorial plane of an industry standard R-4 lug height. For example, in a 19.5LR24 tire, the nonskid depth at the centerline of the tires 20,200 will be approximately one inch (2.5 cm).

Figure 9:
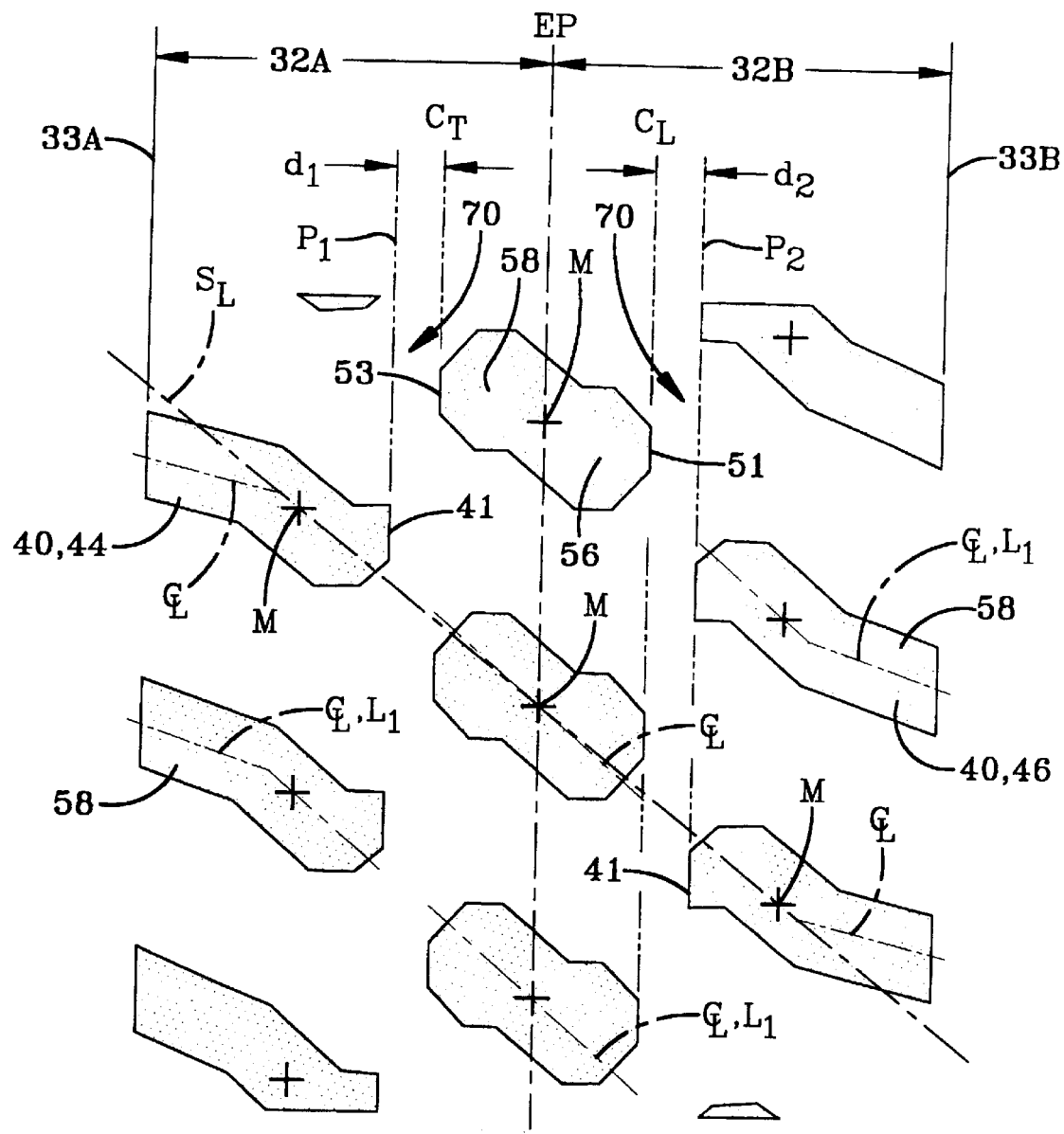
FIG. 9 is a plan view of a portion of the contact patch of the second embodiment tire according to the present invention.

As illustrated in FIGS. 5 and 9, each tire 20,200 has each shoulder lug 40 and each central lug 50 having a surface area centroid M. The nondirectional tire 200 of FIG. 9 has the centroids M of the first row shoulder lug 40, a central lug 50, and a second row shoulder lug 40 lie on a substantially straight line $S_L$, $S_L$ being inclined in the range 35° to 45° relative to an axial plane as illustrated in FIGS. 6–9. This tire 200 illustrated in FIGS. 6–9 has the shoulder lugs 40 of the first and second row 40,46 in the central lugs 50 each having lug centerlines $C_L$ intersecting the centroid M of the respective lugs. The lug centerlines $C_L$ are substantially aligned with the line $S_L$.

Alternatively, the pneumatic agricultural tire 20 of FIGS. 1–5 have each shoulder lug 40 and each central lug 50 having a surface area centroid M, the centroid M of the first or second shoulder lug 40 and the central lug 50 lie in a substantially straight line $SL_2$, $SL_2$ being inclined in the range of 35° to 45° relative to an axial plane. This pneumatic agricultural tire 20 of FIGS. 1–5 has each shoulder lug and central lug each having a lug centerline $C_L$ intersecting the centroids M of the respective lugs. The lug centerlines $C_L$ of the first row 44 of shoulder lugs 40 and the row 60 of central lugs 50 are substantially aligned with the straight line $S_{L2}$ where the shoulder lug 40 centerline $C_L$ of the second row 46 is similarly but oppositely inclined relative to the line $S_{L2}$.

With reference to FIG. 4 as can be seen from the cross-sectional view of the tire, the tires 20,200 have a constant tread arc at the shoulder, the nonskid depth increases to approximately 125% to 175%, preferably 150%, of the nonskid depth as measured from the equatorial plane (EP) of the tires 20,200.

Due to the contour of the tread 32 it can easily be appreciated that the center of the tread bears most of the load carrying capacity while the shoulder regions are provided to increase traction and provide additional biting or digging surfaces which provide traction particularly in loose soil or loose debris. It is believed preferable that the tread lugs 40,50 be reasonably braced using generous angles to further enhance the stiffness of the lugs and to improve its durability.

A novel feature of the directional tread pattern of the tire 20 is in FIGS. 1–5 of the first embodiment and the nondirectional tread pattern of FIGS. 6–9 of the second embodiment tire 200 is that the lugs 40 of the first row 44 and the lugs 40 of the second row 46 do not axially overlap at the equatorial plane. This was a common feature employed in industrial service R-4 tires of the prior art. Secondarily, the central lugs 50 do not overlap or interlock with either the first or the second rows 44,46 of shoulder lugs 40. Again, this feature is not believed to have been employed in this type of tire heretofore. The benefits of this feature is that the tread pattern remains relatively open increasing the overall tractive performance of the tire while not sacrificing the overall ride performance. In every aspect the description of the tire 20 of the first embodiment applies to the tire 200 of the second embodiment, the only difference being the orientation of the lugs 40 of the second row 46 of tire 20 and tire 200. In all other aspects the tires are the same.

What is claimed is:

1. A pneumatic agriculture tire for an industrial type tractor having a maximum section width (W), an axis of rotation, an equatorial plane (EP), centered between the maximum section width and being perpendicular to the axis, a casing having a belt reinforcement structure and a carcass reinforced with rubber coated cords, a rubber tread disposed radially outwardly of the carcass, the tread being divided on each side of the equatorial plane (EP) into a first and a second tread half, the tread has a pair of lateral tread edges, the distance between the tread edges defines the tread width, the tread has an inner tread and a plurality of tread lugs projecting radially from the inner tread, the tread lugs including:

a plurality of central lugs arranged in a circumferentially continuous row and extending across the equatorial plane (EP), each central lug is inclined relative to the equatorial plane (HP), each central lug having a leading end and a trailing end, each leading end and each trailing end having an enlarged lug head, the leading end of each central lug being located on an opposite side of the equatorial plane (EP) relative to the trailing end of the same central lug, the central lugs having a length of about 30% of the tread width;

a plurality of shoulder lugs divided into first and second rows each row of shoulder lugs extending from each of the lateral tread edges toward the equatorial plane of the tire, the shoulder lugs having an axially inner end being axially spaced from a leading end and a trailing end of axially adjacent central lugs, the shoulder lugs having an overall lug length of greater than 30% of the tread width, each shoulder lug being located within one tread half, the shoulder lugs and central lugs are axially spaced at the outer surface of the lugs such that the axially inner ends of the first and second rows of shoulder lugs are axially aligned within each respective row, and the leading ends and trailing ends of the central lugs are respectively axially aligned, a plane $P_1$ tangent to the axially inner ends of the first row of shoulder lugs is spaced an axial distance $d_1$ from a plane $C_T$ tangent to the trailing ends of the central lugs, and a plane $P_2$ tangent to the axially aligned inner ends of the second row of shoulder lugs is spaced a distance $d_2$ from a plane $C_L$, the plane $C_L$ being tangent to the leading ends of the central lugs, the tread being characterized in that the distances $d_1$ and $d_2$ each being at least 5% of the tread width and forming two circumferentially continuous straight channels around the periphery of the tread.

2. The pneumatic agricultural tire of claim 1 wherein the distances $d_1$ and $d_2$ are equal.

3. The pneumatic agricultural tire of claim 1 wherein the planes $C_T$ and $C_L$ are each located an axial distance of at least 5% of the tread width or more from the equatorial plane (EP).

4. The pneumatic agricultural tire of claim 1 wherein the planes $C_T$ and $C_L$ are equally spaced from the equatorial plane EP).

5. The pneumatic agricultural tire of claim 1 wherein each of shoulder lugs of the first and second rows and the central lugs are inclined with respect to the equatorial plane in the same direction.

6. The pneumatic agricultural tire of claim 5 wherein each shoulder lug and central lug has a surface area centroid M, the centroid M of a first row shoulder lug, a central lug, and a second row shoulder lug lie on a substantial straight line $S_L$, $S_L$ being inclined in the range of 35° to 45° relative to an axial plane.

7. The pneumatic agricultural tire of claim 6 wherein the shoulder lugs of the first and second row and the central lugs each have lug centerlines intersecting the centroids M of the respective lugs, the lug centerlines being substantially aligned with the line $S_L$.

8. The pneumatic agricultural tire of claim 1 wherein shoulder lugs of the first row are oppositely inclined relative to the shoulder lugs of the second opposite row.

9. The pneumatic agricultural tire of claim 8 wherein each shoulder lug and central lug has a centroid M, the centroid of a first or second shoulder lug and the central lug lie in a substantially straight line $S_{L2}$, $S_{L2}$ being inclined in the range of 35° to 45° relative to an axial plane.

10. The pneumatic agricultural tire of claim 9 wherein each shoulder lug and central lug each have a lug centerline ($C_L$) intersecting the centroids M of the respective lugs, the lug centerlines of a first shoulder lug and the central lug being substantially aligned with the line $S_{L2}$ while the shoulder lug centerline of a second row is oppositely inclined relative to the line $S_{L2}$.

11. The pneumatic agricultural tire of claim 1 where the tire has a normally inflated and normally loaded tread net-to-gross ratio of less than 35%.

12. The pneumatic agricultural tire of claim 1 wherein the tire has a nominal rim diameter of 24 inches or less and each tread lug has a tread lug height as measured from the inner tread to the radially outer surface of the lug at the equatorial plane of an industry standard R-4 lug height.

\* \* \* \* \*